Figure 5:
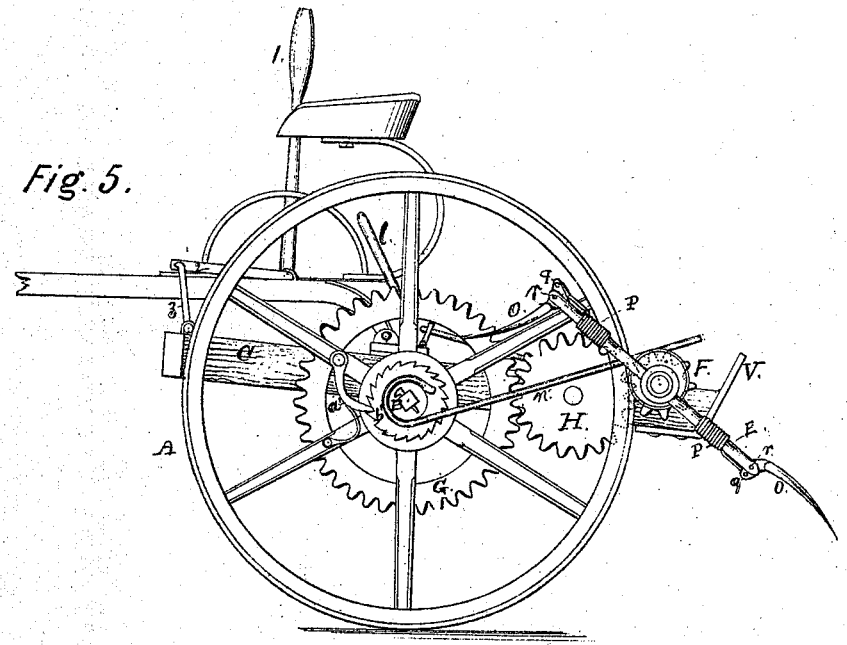

H. C. Varnum,
Comb. Rake & Tedder.
No. 105,611.  Patented July 19 1870.
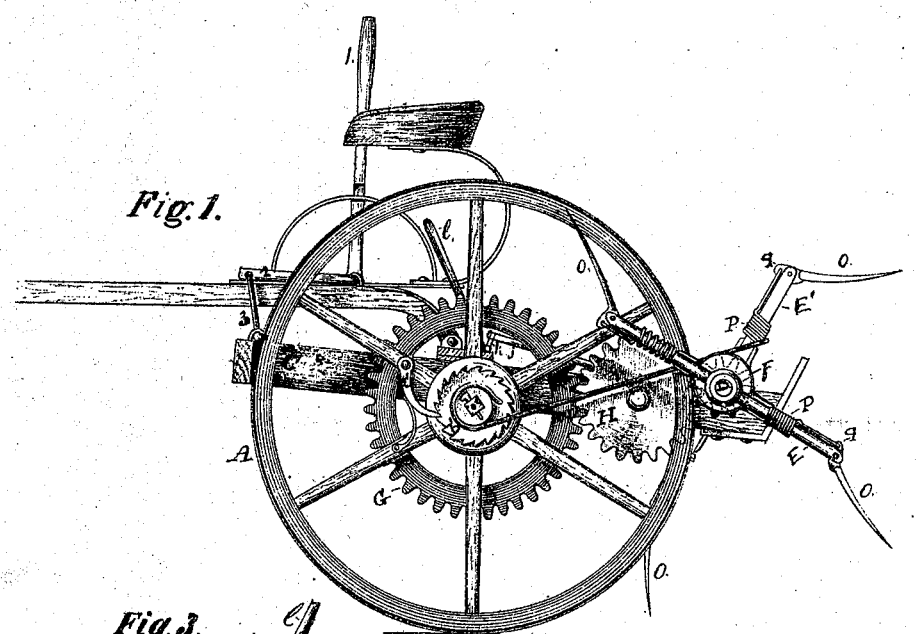
Fig. 1.
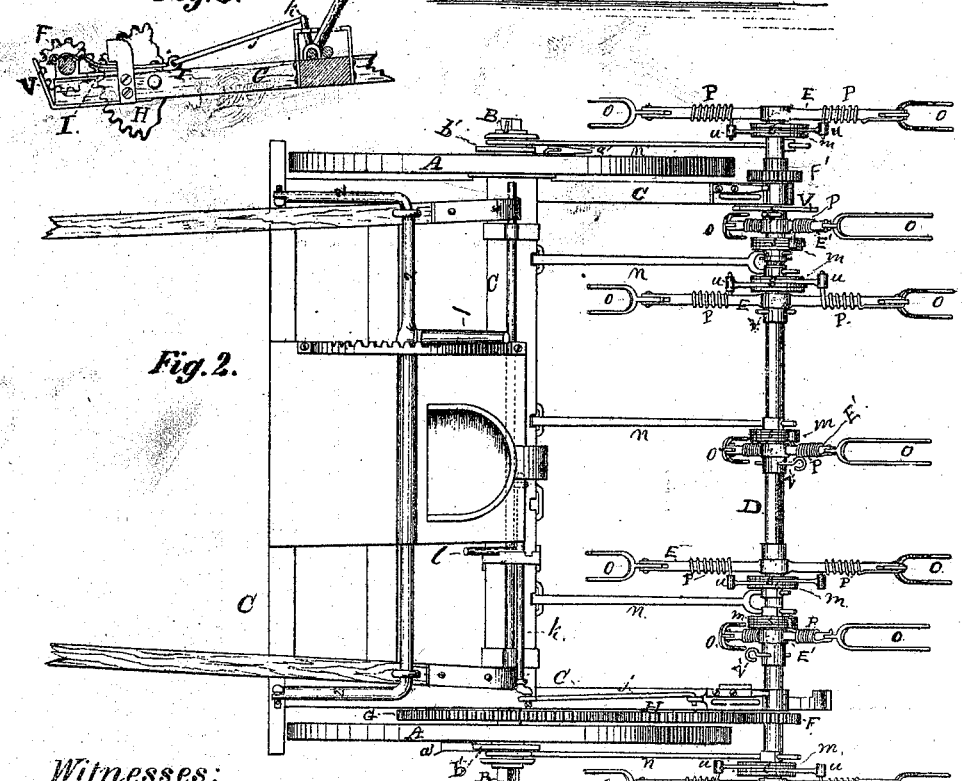
Fig. 3.
Fig. 2.
Witnesses:
Inventor:
Henry C. Varnum
By D. C. Colby & Son
Attorneys
N. PETERS, PHOTO-LITHOGRAPHER, WASHINGTON, D. C.

H. C. Varnum,
Comb'd Rake & Tedder.
No. 105,611. Patented July 19, 1870.

Witnesses:

Inventor:
Henry C. Varnum
By D. C. Colby & Son
Attorneys

UNITED STATES PATENT OFFICE.

HENRY C. VARNUM, OF HARTFORD, VERMONT, ASSIGNOR TO HIMSELF AND JAMES E. LARKIN.

IMPROVEMENT IN COMBINED HORSE HAY RAKE AND TEDDER.

Specification forming part of Letters Patent No. 105,611, dated July 19, 1870.

*To all whom it may concern:*

Be it known that I, HENRY C. VARNUM, of Hartford, in the county of Windsor and State of Vermont, have invented a new and useful Improvement in Horse Hay Rake and Tedder Combined; and I do hereby declare the following to be a full and exact description of the same, reference being had to the drawing that accompanies and forms a part of these specifications.

The primary purpose of this machine is for tedding the mown hay; but by a simple change of position of some of its parts it becomes adapted to the work of a horse-rake.

The first part of my invention relates to provisions made for allowing the tines of the forks that move and lift the hay to drop backward and downward as the arms to which the said forks are attached rise upward, in order that the hay may readily drop off, and not be carried up to be dropped upon and clog the machine.

The Drawing, (2 Sheets.)

Figure 4:
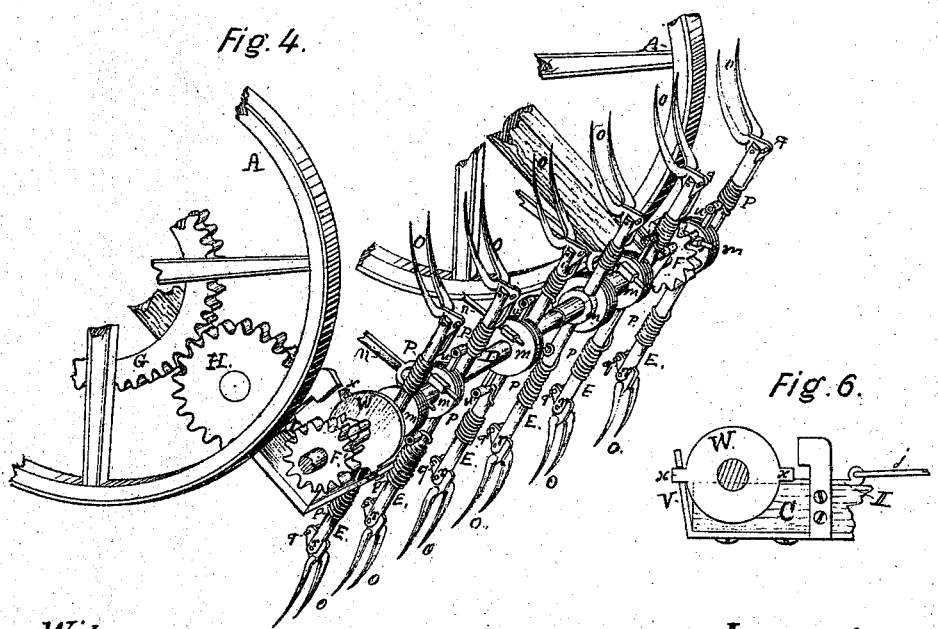
Figure 6:
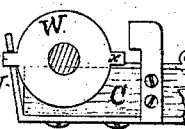

Figure 1, Sheet 1, is a side view of the machine arranged as a hay-tedder; Fig. 2, Sheet 1, plan or top view arranged the same; Fig. 3, Sheet 1, a detached portion, exhibiting the manner of connecting the rotating shaft bearing the forks with the operating parts upon the main frame and axle; Fig. 4, Sheet 2, perspective of the rear portions of the machine arranged as hay-rake, the forks standing in position to gather the hay; Fig. 5, Sheet 2, a side view, representing the forks as just discharging the hay; Fig. 6, Sheet 2, detached portions, the relations and use of which will be given hereinafter.

Letter A, the main wheels that bear all the other parts; B, an axle, into which the wheels A are loosely fitted. This axle is made to revolve, as the wheels roll forward, by means of the ratchets $b'$, which are fast on the axle B, and the pawls $a'$, which are attached to wheels A. C, parts of the main frame, resting on axle B; D, a shaft resting in bearings at the rear of the frame side pieces, C; E, small bars or arms lying at right angles to the shaft D. Having a wide collar-like central portion, they are slipped upon the shaft D, and arranged at equal distances from each other, and stand as illustrated in Fig. 1. F is a small gear-wheel firmly affixed upon the shaft D; G, a gear-wheel fastened firmly upon the axle B, and rotates therewith; H, an intermediate gear-wheel, meshing into both F and G; I, a metal plate lying upon the bar C, and provides a bearing for the shaft D, and is, through the reach $j$ and eccentric-rod $k$, connected with the operating-lever $l$; $m$, eccentrics placed upon the shaft D, one at each of the cross-bars E, the object of which will be more fully explained hereinafter; $n$, rods attached by staples to the frame C, as shown in the drawing, except the two outer ones, which turn in the form of a ring around the axle B near each end, as also exhibited in the drawing, and operated to keep the eccentrics from turning or rotating with the shaft D; O, the fork, attached, one to each end of the several bars or arms E, by joint or pivot $r$, each having a short arm, $q$, for a purpose which will appear as we proceed with the description; P, coil-springs of wire, two on each of the bars E, as represented in the drawing; Q, a short lever or projection extending from the shank of the forks, and connecting with the outer end of the springs P; $r$, the pin uniting the forks O with the rods E, there being formed in each end of these rods E a plane slot, into which the contiguous part of the fork-shank is fitted and retained by pin $r$; S, a thimble, which just fits into the eccentric on the shaft D, having two oppositely-extending arms, $u$, which receive the inner ends of the coil-springs P; $t$, the central portion of the bars E, provided with opening to receive the shaft D, and with a collar and staying-pin, the said pin running through the said collar and shaft D; V, a catch fastened to the rear end of the bar C, and receives the tooth $x$, as exhibited in Fig. 6; W, a disk, immovable, upon the shaft D, and provided with the two teeth or stops $x\ x$. This disk W, as also the catch V, are brought into use only when the machine is used as a hay-rake, as will more fully appear in the description of the modes of working my device for that purpose. Z are pins that retain the arms E in position, and prevent their turning upon the shaft D.

$Z'\ Z'\ Z'$ are removable easily, the reasons for which will be apparent when we explain the change necessary to convert the device from hay-tedder to hay-rake, and the opposite.

I will first describe the machine and its operation as hay-tedder, and, secondly, the changes requisite to convert it to hay-rake, and its operation as such.

As the machine is moved forward upon the wheels A, the gear G, meshing into the gears of wheel H, revolves it, which in turn acting upon the pinion F, rotates the shaft D, and with it the arms E, bearing the forks O.

Operating-lever 1, crooked lever 2, and connecting-rod 3 are supplied to provide means within reach of the driver for adjusting the shaft D at suitable distance from the ground.

In Fig. 1 the lever 1 is thrown back, which lets the front end of the frame C rise, and the rear end, bearing the shaft D, fall sufficiently to bring the tines of the forks O, when revolving, quite low, so as to take the hay.

By bearing the handle of the lever 1 forward, the lever 2 is rolled in its bearings, and the two ends, bent in the form of an elbow, are pressed downward, and, acting upon the connecting-rods 3, depress the front of frame C, raising correspondingly the rear, so that the forks will be far above the ground. In this position should the parts be when the machine is being moved from place to place. Suitable devices, as $y$ in Figs. 1 and 2, should be applied to retain these levers 1 and $l$ in the desired position.

The object of a hay-tedder is to stir, lift up, and turn over the hay.

In Fig. 1 the forks on the lower quarter will be seen to stand nearly vertical. In the next upward quarter to the rear the tines of the forks will be found to lap or turn downward, the object of this arrangement being to bring the said forks into the best position, when reaching the hay, for stirring and lifting it well, and then, as they rise from the ground, to leave or drop it freely. These changes of position in the tines of the forks O are produced by the eccentrics $m$ on the shaft D, through the thimbles S and the springs P.

When the shaft D revolves, the arms E are carried around with it, and also the springs P and the thimbles S, while the cams or eccentrics $m$ do not revolve, being stayed by rods $n$.

As the thimbles S are not concentric with the shaft D, the springs P, which, as we have already seen, attach to the arms $u$ of these thimbles, will be alternately forced outwardly and drawn inwardly, and, acting on the short arm $q$ of the forks O, provide for and secure that variation in the position of the tines of these forks above mentioned, and as illustrated in Figs. 1 and 2 of the drawing. Thus, as the shaft D is kept in constant rotation while the machine is being used as hay-tedder, one series after another of the forks O is brought into action upon the hay, giving it a vigorous and effectual stirring, turning up the under side to the air and sun, quickening the drying process, and performing its work in the most expeditious and efficient manner.

I will now pass to consider my machine as horse-rake.

For the purpose of saving the farmer the purchase, housing, and repairs of an additional implement, I provide the double capacity of this device.

Fig. 4 represents the machine as a rake; but the front pair of the arms E is left off in this view, in order to the better presentation of the pinion F, catch V, and the disk W, the latter bearing the stops $x\ x$.

To make the change from hay-tedder to rake, let the shaft D be removed from its bearings, (which should have convenient structure for this purpose,) and be turned end for end, and replaced, as in Fig. 4, care being taken to replace also the rods $n$. Next draw out the three pins Z' Z' Z', and turn the three arms E' E' E' on the shaft D until the forks they bear come into line with those on the other arms, E, as exhibited in this said Fig. 4; then replace the pins Z' Z' Z', (another set of holes having been provided for them in the collar part of the central hub, $t$,) and we have a double-headed rake.

While the rake is gathering hay, the shaft D must not revolve, so the operator bears back the upper end of lever $l$, relieving the pinion F from the influence of the wheel H, and one of the stops $x$, being thus brought under the catch V, prevents the said shaft from turning, the lower row of forks being in proper position to take and gather the hay. These forks in this arrangement face to the front, and are thus in position to yield to any serious obstruction they may encounter, such as stones or roots, and for the time turn backward, the spring P returning it to position when the obstruction has been passed. Herein may be seen the reasons for changing ends of shaft D.

To discharge the hay from the rake, the operator, in his seat, puts his hand to the lever $l$, and bears its upper end forward sufficiently to bring the pinion F into connection with wheel H, and the stop $x$ having thus moved from the catch V, the shaft D commences to revolve, and at the position presented in Fig. 5 leaves the hay, the shaft meantime continuing its rotation until the next set or row of forks has moved over frontward and down to the hay, when the lever $l$ should be suddenly and promptly carried backward, placing the other stop $x$ under the catch V, which, in its turn, holds the shaft D stationary until the gathered hay should be discharged, as before.

The ratchets on the wheels A are simply to prevent the working of the parts when the machine is moved backward, and to enable the machine to continue its work on a curve, or on turning, when one of the wheels A may be moving forward while the other is rolling backward, and in other respects entirely inoperative. These ratchets being fast upon the axle B, it will be apparent that the said axle will revolve only when one at least of the wheels A is rolling forward; but as this device of the ratchets is not different from that heretofore used for like purposes, it requires no especial description here.

What I claim as my invention, and desire to secure by Letters Patent, is—

1. The thimbles S, the coil-springs F, and the forks O, when arranged and combined to operate substantially as described, and for the purposes set forth.

2. The combination of the rods $n$ with the cams $m$ and the cross-bar of the frame or wheel-axle, for the purpose described.

In testimony whereof I have signed my name to this specification in the presence of two subscribing witnesses.

HENRY C. VARNUM. [L. S.]

Witnesses:
    J. B. RAND,
    LUTHER ROBY.